(12) United States Patent
Pantelias et al.

(10) Patent No.: US 12,413,373 B2
(45) Date of Patent: Sep. 9, 2025

(54) OVERLAPPING OFDMA CHANNELS FOR COEXISTENCE OF 3.1 MID-SPLIT AND HIGH-SPLIT CABLE MODEMS

(71) Applicant: Avago Technologies International Sales Pte. Limited, Singapore (SG)

(72) Inventors: Niki Pantelias, Berkeley Lake, GA (US); Lisa Denney, Suwanee, GA (US); Avi Kliger, Ramat Gan (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 652 days.

(21) Appl. No.: 17/838,365

(22) Filed: Jun. 13, 2022

(65) Prior Publication Data
US 2022/0399981 A1    Dec. 15, 2022

Related U.S. Application Data

(60) Provisional application No. 63/210,315, filed on Jun. 14, 2021.

(51) Int. Cl.
*H04L 5/00* (2006.01)
*H04L 12/28* (2006.01)

(52) U.S. Cl.
CPC .......... *H04L 5/0092* (2013.01); *H04L 5/0007* (2013.01); *H04L 12/2801* (2013.01)

(58) Field of Classification Search
CPC ............... H04L 5/0092; H04L 5/0007; H04L 12/2801; H04L 5/008; H04L 5/0005; H04L 5/0044; H04W 72/0453
See application file for complete search history.

(56) References Cited

U.S. PATENT DOCUMENTS

| | | | |
|---|---|---|---|
| 2017/0019347 A1 | 1/2017 | Al-Banna et al. | |
| 2019/0123818 A1* | 4/2019 | Zhang | H04B 10/2575 |
| 2019/0312762 A1* | 10/2019 | Dionisi | H04L 12/2801 |

OTHER PUBLICATIONS

DOCSIS® 3.1, Data-Over-Cable Service Interface Specifications, 4 pages (Year: 2016).*
Cable Television Laboratories, Inc. 2019 Data-Over-Cable Service Interface Specifications DOCSIS 4.0.
Extended European Search Report—EP 22178833.4; Nov. 10, 2022.

* cited by examiner

*Primary Examiner* — Sharmin Chowdhury
(74) *Attorney, Agent, or Firm* — Foley & Lardner LLP

(57) ABSTRACT

In some aspects, the disclosure is directed to methods and systems for overlapping orthogonal frequency-division multiple-access (OFDMA) channels for coexistence of devices and legacy devices, including DOCSIS 3.1 mid-split and high-split cable modems (CMs). Described are systems and methods for providing a CMTS with capability for managing overlapping OFDMA channels to support mid-split and high-split CMs, without modification to legacy CMs.

18 Claims, 11 Drawing Sheets

US 12,413,373 B2

OVERLAPPING OFDMA CHANNELS FOR COEXISTENCE OF 3.1 MID-SPLIT AND HIGH-SPLIT CABLE MODEMS

RELATED APPLICATIONS

The present application claims the benefit of and priority to U.S. Provisional Application No. 63/210,315, entitled "Overlapping OFDMA Channels for Coexistence of 3.1 Mid-split and High-split Cable Modems," filed Jun. 14, 2021, the entirety of which is incorporated by reference herein.

FIELD OF THE DISCLOSURE

This disclosure generally relates to systems and methods for network communications. In particular, this disclosure relates to systems and methods for channel overlapping for orthogonal frequency division-multiple access (OFDMA) communications systems.

BACKGROUND OF THE DISCLOSURE

Network communications system operators, such as broadband cable system operators, are experiencing a high demand for more bandwidth for customers for uploads, video conferencing, remote and collaborative working environments, network video games, etc. In some implementations, upload and download channels may be split across different frequency ranges, though this may cause issues supporting legacy communications devices unable to handle higher frequency ranges. As a result, the frequency plans may be complex, and may not be possible in many instances without resulting in impaired communications or loss of operability for legacy devices.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
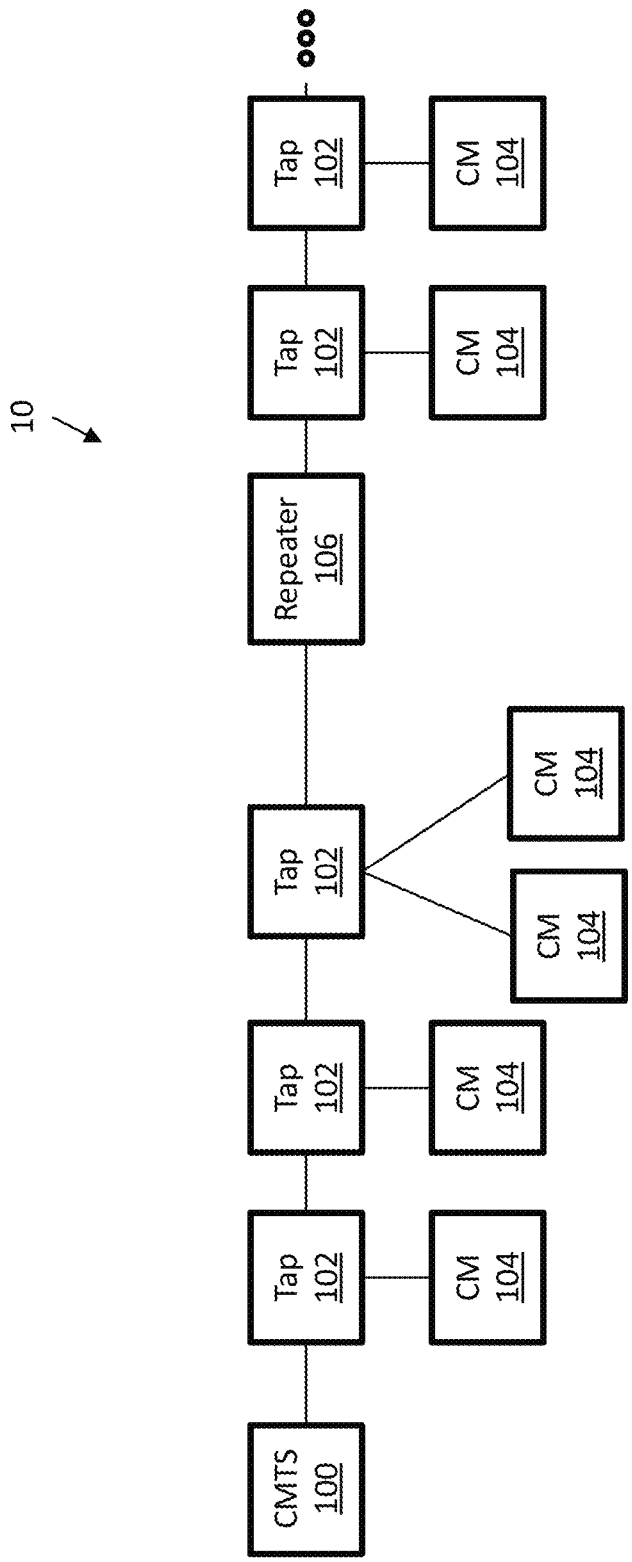
FIG. 1A is a block diagram of a cable modem environment, according to some implementations.

The details of various embodiments of the methods and systems are set forth in the accompanying drawings and the description below.

DETAILED DESCRIPTION

The following standard(s), including any draft versions of such standard(s) are hereby incorporated herein by reference in their entirety and are made part of the present disclosure for all purposes: IEEE 802.14™; DOCSIS 3.1™; DOCSIS 4.0™; and MoCA 2.5™ Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for overlapping OFDMA channels for coexistence of 3.1 mid-split and high-split cable modems; and Section B describes a network environment and computing environment which may be useful for practicing embodiments described herein.

A. Systems and Methods for Overlapping OFDMA Channels for Coexistence of 3.1 Mid-Split and High-Split Cable Modems Cable operators are in great need of more upstream capacity to meet growing customer demand for uploads, video conferencing, collaborative work, and so forth. One potential strategy for increasing cable plant upstream capacity is to provide more upstream spectrum by raising the upstream split frequency. For example, common upstream splits such as 42 MHz or 65 MHz may be utilized in some implementations, or higher frequencies such as splits of 85 MHz or 204 MHz, though other frequencies may be utilized. Operators are also deploying cable modems (CMs) and cable modem termination system (CMTS) devices that support these splits. However, not all devices support all frequencies. In particular, operators deploying a "high split" (e.g. 204 MHz or similar frequencies) solution may end up with a CMTS supporting 204 MHz operation, connected to a mix of DOCSIS 3.1 CMs, some of which support 204 MHz and some of which only support lower frequencies (e.g. 85 MHz, sometimes referred to as "mid split"). The plant may also likely contain many DOCSIS 3.0 CMs, and it may contain some set top boxes (STBs) using out-of-band protocols.

In today's cable systems, the spectrum up to the current split of 42 or 65 MHz is occupied by many DOCSIS 3.0 or earlier CMs or STBs ("legacy devices"), which use DOCSIS single channel-quadrature amplitude modulation (SC-QAM) channels and/or OOB protocols. When operators change to higher splits, such as 85 MHz or 204 MHz, it is likely that they will retain their current spectrum plan in the range that these legacy devices occupy, to avoid interruption of service to those devices. In the new spectrum, operators will construct a new frequency plan using DOCSIS SC-QAM and OFDMA channels. This frequency plan is subject to a number of constraints:

Per DOCSIS specifications, DOCSIS SC-QAM channels are allowed only up to 85 MHz. From 85 to 204 MHz, OFDMA channels must be used.

Even below 85 MHz, operators strongly prefer to use OFDMA channels due to their higher spectral efficiency.

The DOCSIS specification requires a CMTS to support two DOCSIS 3.1 OFDMA receivers on a Service Group (i.e. a particular section of cable plant consisting of the CMTS plus a number of CMs reachable on that plant section). Due to the cost of hardware, no CMTS currently supports more than two OFDMA receivers per Service Group.

Each OFDMA channel can be up to 96 MHz wide.

Given these constraints, for high split plant (204 MHz split), a typical frequency plan might be:

OOB: 8 to 13 MHz
DOCSIS SC-QAM channels: 18 to 42 MHz
DOCSIS OFDMA channel 1: 42 to 108 MHz
DOCSIS OFDMA channel 2: 108 to 204 MHz This frequency plan works well if all DOCSIS 3.1 CMs on the plant are high-split capable. However, as described earlier, in many implementations, the plant will contain a mix of high-split and mid-split CMs. Mid-split CMs may not be capable of utilizing DOCSIS OFDM channel 1 (e.g. 42-108 MHz) if their capacity ends at 85 MHz, since DOCSIS OFDMA channel 1 goes up to 108 MHz.

In the absence of implementations of the systems and methods discussed herein, options for addressing this are limited:

If OFDMA channel 1 remains at 42-108 MHz, mid-split CMs cannot use it, and would only be able to operate on the DOCSIS SC-QAM channels below 42 MHz. This restriction would limit the CM's transmit capability to the available bandwidth on those SC-QAM channels. In addition, these channels are typically already very congested with legacy devices, and limiting DOCSIS 3.1 mid-split CMs to these channels would make that congestion worse.

If OFDMA channel 1 is changed to cover 42-85 MHz, then mid-split CMs can use it, but this leaves a gap from 85 to 108 MHz which is not used by any device. This represents a loss of 15% or more of the total upstream capacity (about 200 Mbps out of 1.3 Gbps, with the exact numbers depending on the exact conditions).

If OFDMA channel 1 is changed to cover 85 to 108 MHz, and SC-QAM is used from 42 to 85 MHz, mid-split CMs would be able to operate on these SC-QAM channels, but there is still a loss of capacity due to the lower spectral efficiency of SC-QAM. This could also be as much as 15% of capacity (200 Mbps out of 1.3 Gbps, again depending on the exact conditions).

If DOCSIS time and frequency domain multiplexing (TaFDM) is used to share 42-85 MHz between OFDMA channel 1 (for high split CMs) and SC-QAM (for mid-split CMs), there is still a loss of capacity which depends on the relative usage of this spectrum between mid-split vs high-split CMs, but could again be as high as 15% of capacity.

In theory, CM software could be changed so that the mid-split CMs accept the configuration of OFDMA channel 1. The CMTS would be responsible for making sure no grants are given to mid-split CMs above 85 MHz. However, the DOCSIS specification still requires these CMs to attempt to transmit OFDMA probes across the entire channel, including above 85 MHz. This would cause the CM to place high levels of transmit energy into its own diplexer transition band (e.g. in the range of 85-108 MHz), which will reflect back most of that energy. CMs are not designed for this and the resulting emissions would impair other traffic on the plant and possibly shorten the life of the CM.

In theory, a CMTS with three burst receivers per Service Group could add an additional channel to the frequency plan above: OFDMA channel 3, from 42 to 85 MHz. OFDMA channel 3 would use a separate receiver, with the CMTS scheduler managing the overlap between OFDMA channels 1 and 3 in a manner similar to how logical channels were defined for DOCSIS 2.0. However, the additional cost of the third receiver makes this undesirable. Additionally, deployed CMTSs do not include this third receiver, so operators would need to reduce the capacity of their currently deployed CMTSs, or replace them with new devices. This would be very costly for the operator.

Instead, implementations of the systems and methods discussed herein solve the problems discussed above by having the CMTS software configure the system in a way that appears to create an additional OFDMA channel 3 as described above, but without requiring an additional burst receiver to receive OFDMA channel 3. The burst receiver and high-split CMs are set up to receive OFDMA channel 1 as usual. Meanwhile, the mid-split CMs receive a version of the setup messages that appears to describe OFDMA channel 3 as a separate channel, but in fact are constrained to match the messages for OFDMA channel 1 in the region below a predetermined split frequency (e.g. 85 MHz). In this way, the receiver is able to receive data from mid-split CMs without ever being aware of OFDMA channel 3. Accordingly, in many implementations, a single burst receiver or receiver instance may be utilized to receive communications from both high-split and mid-split CMs.

In many implementations, the systems and methods discussed herein may be entirely CMTS-based and require no changes to the software or hardware configurations of DOCSIS 3.1 CMs. In some implementations, a CMTS may create upstream channel descriptors (UCDs) and upstream bandwidth allocation maps (MAPs) for a channel covering the complete desired frequency range (the "Long Channel"). The CMTS may configure burst receiver and high-split-capable CMs to use the Long Channel. The CMTS software may then create a separate set of UCDs and MAPs using a different channel ID (the "Short Channel"), with the same contents as the Long Channel, except that these UCDs and MAPs end at a predetermined split frequency (e.g. 85 MHz) or below. In such implementations, mid-split CMs are always assigned the Short Channel, and will accept this channel since it ends at or below their diplexer cutoff. Since the short channel contains no minislots or subcarriers above 85 MHz, all mid-split CM transmissions are automatically constrained to be below the diplexer cutoff. Unlike logical channels, the burst receiver does not need any awareness of the Short Channel, and correctly receives bursts from "Short CMs" since those grants also appear on the Long Channel.

FIG. 1A is a block diagram of a cable modem environment, according to some implementations. As discussed above, a CMTS device 100, which may be referred to as a termination device, node, computing device, communication device, communication terminal, broadband device, broadband terminal, or by any similar term, may communicate via a network (e.g. a cable network or broadband network) with one or more devices 104, such as cable modems (CMs 104). CMs 104 may comprise cable modems, routers, switches, wireless access points or gateways, firewalls, or any other type and form of network device, and may communicate with or connect to additional computing devices (not illustrated) such as local area network (LAN) devices (e.g. computers, tablets, IoT devices, gaming consoles, automation systems, or any other type and form of computing device). In many implementations, one or more CMs 104 or other such devices may be connected via a tap 102 to a cable or broadband communication system. In many implementations, taps 102 may be connected to a primary cable or trunk, and may split off branches for one or more CMs 104. Taps 102 may comprise filters, amplifiers, and/or splitters, and may be described in terms of outputs (e.g. 2-port tap, 3-port tap, etc.). In many implementations, to extend the broadband system to additional cable modems, one or more repeaters or amplifiers 106 may be deployed as intermediary devices between the CMTS 100 and one or more taps 102 and/or CMs 104. Repeaters or amplifiers 106 may provide signal amplification, noise or echo mitigation or cancellation, equalization or other filtering, or other such functions.

Figure 1B:
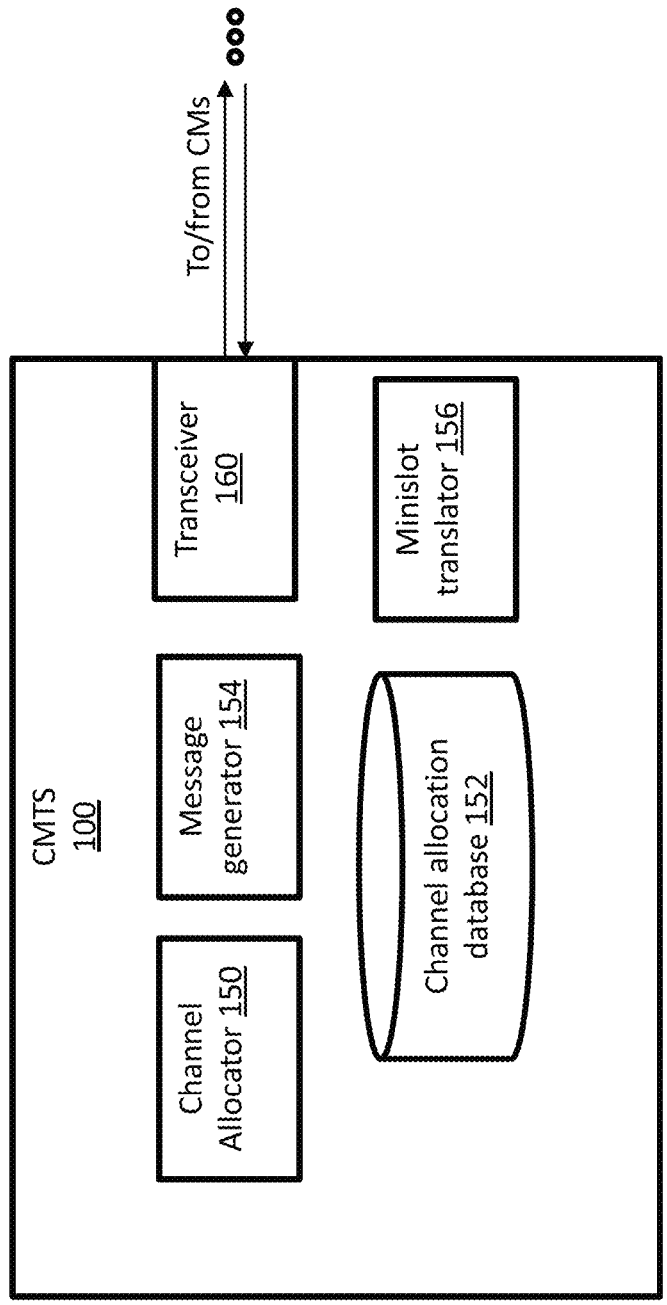
FIG. 1B is a block diagram of an implementation of a cable modem termination system (CMTS) node.

FIG. 1B is a block diagram of an implementation of a cable modem termination system (CMTS) node 100. Additional components may be included in many implementations, such as processors, power supplies, memory and/or buffers, physical input and/or output ports, monitoring agents, or other such hardware and/or software. Components of the CMTS node 100 may be realized in hardware, software, or a combination of software. For example, in some implementations, components such as channel allocator 150, message generator 154, and minislot translator 156, discussed in more detail below, may be realized in hardware such as ASICs, FPGAs, SoCs, or other such hardware, or as software components or modules executed by one or more processors. Although shown as separate components, in many implementations, components 150-156 may be part of the same physical circuitry, subcircuit, module, or other hardware. Similarly, although shown as a single node 100, in many implementations, functions may be split or divided between multiple nodes 100 (e.g. a first node may maintain a channel allocation database 152 and distribute it for use by additional nodes on the same cable system).

Channel allocator 150, which may be referred to variously as an allocator, UCD or MAP configurator, channel assignor, circuitry configured to generate channel allocations, or by similar terms, may comprise hardware, software, or a combination of hardware and software for allocating channels, sub-channels, minislots, or other bandwidth subdivisions to different CMs or other devices. In many implementations, channel allocator 150 may generate UCDs and MAPs for assigning or allocating upstream and/or downstream channels to CMs or other devices, and may transmit such UCD and/or MAP messages to CMs or other devices via a transceiver 160. In some implementations, channel allocator 150 may generate multiple allocations, UCDs, and/or MAP messages for different CMs based on capability, such as burst receiver and/or high-split-capable CMs; mid-split-capable CMs; low-split-capable CMs (sometimes referred to as legacy CMs), etc. For example, in some implementations, channel allocator 150 may generate UCDs and MAPs for a channel covering a complete frequency range (sometimes referred to as a "long channel"), as well as UCDs and MAPs for a channel covering a subset of the frequency range (sometimes referred to as a "short channel"). Different channels may be associated with different channel identifiers. In many implementations, the channels may have corresponding or identical contents or associations within a subset of the frequency range. For example, the UCDs and MAPs for the short channel may be substantially identical (e.g. with the same or identical physical parameters, including subchannel frequency ranges, timings, grants, or other physical channel parameters, albeit with a different channel ID) to a corresponding portion (e.g. same frequencies or subchannels) of the UCDs and MAPs for the long channel. Such identical or similar portion may be below a specified frequency, such as below 85 MHz in many implementations. Legacy CMs or those incapable of communicating above the specified frequency may utilize the short channel allocations (as the allocations will be below a diplexer cutoff frequency of the CMs), while CMs capable of communicating above the specified frequency may utilize the additional allocations of the long channel. Although described in terms of a cutoff frequency of 85 MHz, in other implementations, other cutoff or dividing frequencies may be utilized. In some implementations, multiple channels may be utilized (e.g. multiple short channels with different bandwidths, such as a first short channel to 85 MHz, a second short channel to 108 MHz, etc.).

Such allocations and/or generated UCDs and/or MAP messages may be stored in a channel allocation database 152, which may be a data array, database, flat file, or any other type and form of data structure for storing grants or assignments of channels or subchannels to devices. The database 152 may be stored locally as shown, or may be stored externally (e.g. on another device, shared amongst CMTS nodes in a system, or otherwise stored or distributed).

Message generator 154, which may be part of a channel allocator 150 as discussed above, may generate UCD and/or MAP messages for transmission via transceiver 160. In some implementations, message generator 154 may generate a message using extracted data values from a channel allocation database 152. In other implementations, message generator 154 may receive allocation identifications from a channel allocator 150 and may generate corresponding UCD or MAP messages. The messages may be queued for transmission via transceiver 160, and may be transmitted periodically, in response to requests (e.g. ranging request (RNG-REQ) messages or other requests) from CMs, etc.

Figure 2A:
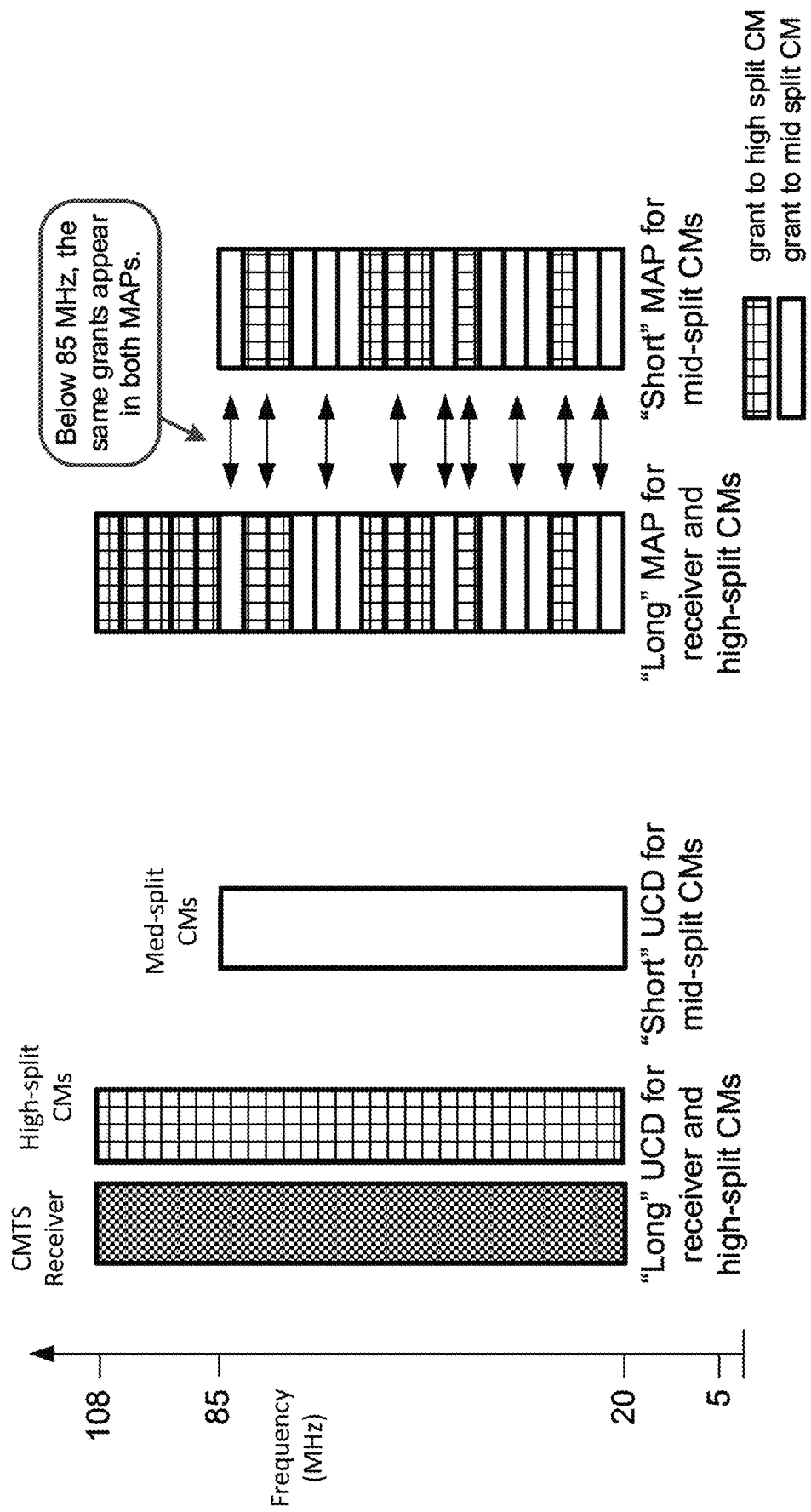
FIG. 2A shows graphs of example frequency distributions for Long and Short channel UCDs and MAPs, according to some implementations.
Figure 2B:
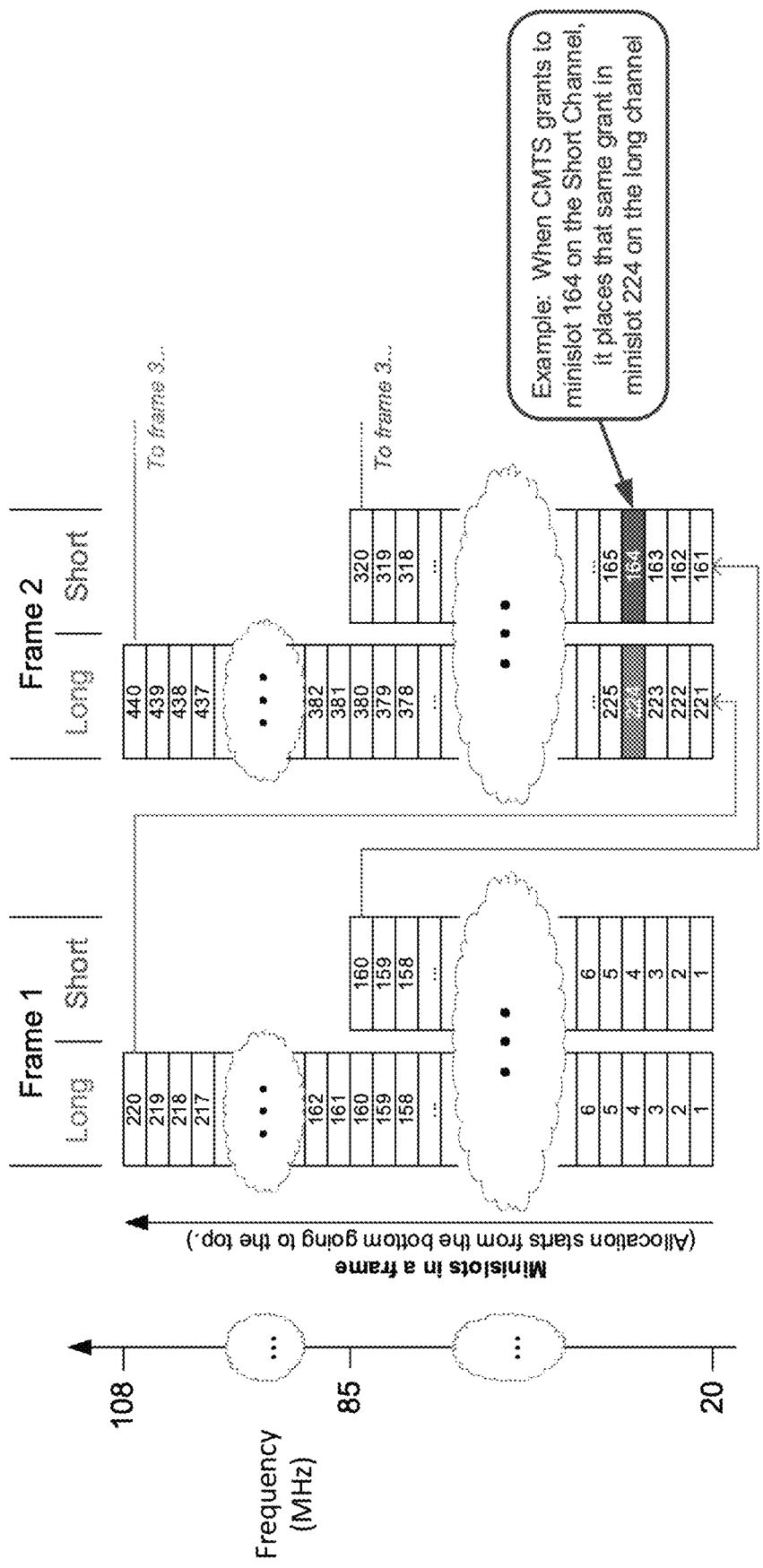
FIG. 2B is a graph illustrating minislot numbers in different mappings, according to some implementations.

As discussed above, the contents of short channel allocations or UCDs and MAPs may be identical, substantially identical, or similar to the contents of long channel allocations or UCDs and MAPs, with corresponding grants to different devices. In many implementations, minislot numbering or timing offsets may be different for these channels, while substantially similar otherwise. For example, referring ahead to FIG. 2A, illustrated are graphs of example frequency distributions for long and short UCDs and MAPs, according to some implementations. In many implementations, the Long Channel will contain more minislots than the Short Channel. However, minislot numbering typically must be continuous within a channel. As a result, the same minislot in time/frequency will have different numbers on the Long Channel vs the Short Channel, as shown in the illustration of FIG. 2B. The CMTS software will translate back and forth as needed (e.g., different minislot numbers must be used for the same grant on the two different channels, and the burst receiver uses Long Channel minislot numbers to report request arrival times, so CMTS software needs to convert to Short Channel minislots when determining acknowledgement (ACK) times for the Short Channel). Returning to FIG. 1B, such translations may be made by a minislot translator 156, which may comprise a parser, editor, translator, lookup table, regex, or similar function for replacing minislot values in incoming communications with corresponding values from other channel allocations. For example, in some implementations, upon receipt of a communication from a CM or other device utilizing a short channel or allocation using a subset of a frequency range, the minislot translator 156 may extract and replace a minislot identifier in the communication with a corresponding minislot identifier of a long channel or second allocation using a larger portion or the entirety of a frequency range. In some implementations, a complete lookup table or translation table may be stored (e.g. identifying minislot 221 of the long channel as associated with minislot 161 of the short channel as shown in the example of FIG. 2B; minislot 222 of the long channel as associated with minislot 162 of the short channel; etc.). In other implementations, an offset value may be stored, and the minislot value in an incoming communication may be adjusted (e.g. increased or decreased) by the offset value (e.g. 60 slots in the example of FIG. 2B). In various implementations minislot translator 156 may translate or modify minislot values in communications received from CMs (or other devices), translate or modify minislot values in communications transmitted to CMs (or other devices), or both. As discussed above, in some implementations, minislot values or assignments may be used for timing measurements. For example, a CM may transmit a message to the CMTS reporting an arrival time of a communication via a timestamp or similar identifier. The timestamp or similar identifier may be based on the minislot timing, and accordingly, in some implementations, the minislot translator or CMTS may modify the timestamp by an offset value based on a difference between the minislot numbering of the utilized channel (e.g. short channel minislot numbering vs. long channel minislot numbering), such as by subtracting the offset value from the timestamp. This may allow the CMTS to properly identify acknowledgment times for transmissions received by CMs or other devices.

As discussed above, communications to and from the CMTS may be transmitted and/or received via a transceiver 160, which may comprise hardware, software, or a combination of hardware and software for communicating via the cable or broadband system. For example, transceiver 160 may comprise physical port(s), amplifiers, filters, multiplexers, encoders or decoders, equalizers or pre-equalizers, or other circuitry or components for transmitting and receiving data signals or frames of a communication. Transceiver 160 may be controlled by a processor (not illustrated), and/or one or more of a channel allocator 150, message generator 154, minislot translator 156, or other components.

Figure 3:
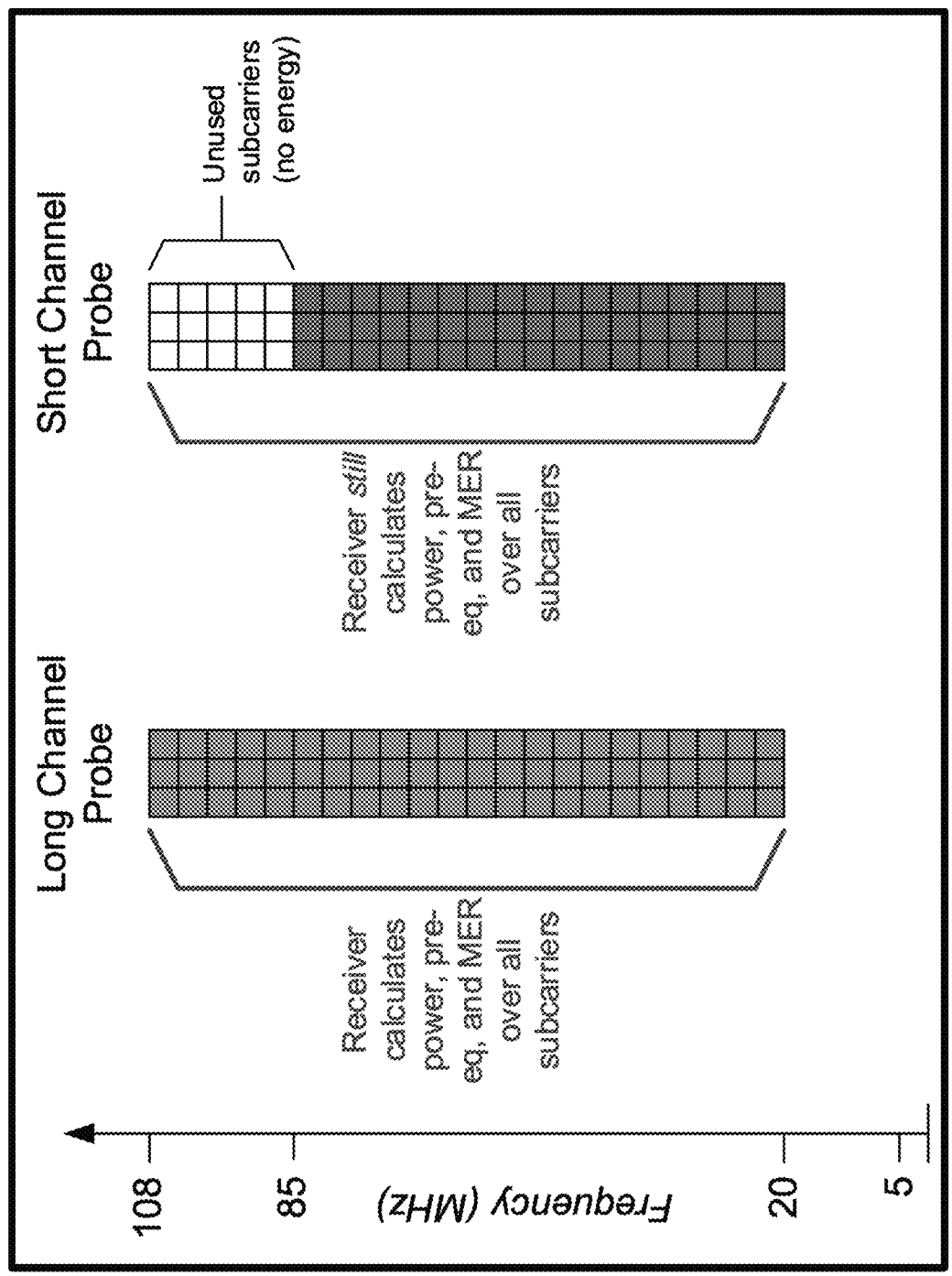
FIG. 3 is an illustration of differences in probe processing for Long and Short channels, according to some implementations.

In many implementations, when receiving a probe, the burst receiver will expect CMs to transmit on all non-excluded subcarriers of the Long Channel. However, mid-split CMs will only transmit on non-excluded subcarriers of the Short Channel. The CMTS software will make the necessary adjustments to correct for "missing" subcarriers, as shown in the illustration of FIG. 3. For example, as shown, when receiving a probe, the burst receiver will expect CMs to transmit on all non-excluded subcarriers of the Long Channel. However, mid-split CMs will only transmit on non-excluded subcarriers of the Short Channel. This may result in reporting total power which is less than expected, even when power-spectral density (PSD) is on target, due to the "missing" subcarriers. The CMTS software will need to make the necessary adjustments to correct for "missing" subcarriers. In some implementations, the CMTS software may use fine ranging for measuring and adjusting power, instead of using probes.

For pre-equalization probing and calculation, in some implementations, a receiver may report "garbage" coefficients for "missing" subcarriers. To address this, the CMTS software may truncate pre-eq coefficients for Short Channel CMs to include only valid subcarriers, or make other suitable corrections.

For per-subcarrier receive modulation error ratio (RxMER) measurements, in some implementations, a receiver may report "garbage" values for "missing" subcarriers. To address this, the CMTS software may truncate per-subcarrier RxMER for Short Channel CMs to include only valid subcarriers, or make other suitable corrections.

In some implementations, overlapped channels may be used for CM initialization. The MAC domain descriptor (MDD) may be used to advertise an upstream upper band edge (e.g. 204 MHz or some other predetermined frequency). High-split CMs will choose corresponding (e.g. 204 MHz) diplexer settings, while mid-split CMs will choose a lower frequency (e.g. 85 MHz). Since the O-INIT-RNG-REQ message transmitted by a CM when it first ranges on an OFDMA channel does not contain an upstream channel ID, the CMTS can't tell if the CM is trying to come in on the Long or Short Channel. To be safe, in its first RNG-RSP message, the CMTS should always assume that the CM intended to use the Short Channel. The CMTS includes the channel ID of the Short Channel in its RNG-RSP. If the CM is a high-split CM using the Long channel, it will switch to the short channel when it sees the Short Channel ID in the RNG-RSP. (To avoid needing to switch the CMs to the Short Channel, the CMTS can omit the Long Channel from Upstream Ambiguity Resolution List in MDD—then new CMs joining the network will not attempt to use the Long Channel, which saves a step.) The reason for the CMTS always assuming the Short Channel is to prevent the unrecoverable error case where the CM is a mid-split CM and the CMTS assumes a Long Channel and incorrectly grants bandwidth allocations unreachable by the mid-split CM. After forcing all CMs to use the Short Channel for initial ranging, the CMTS learns the capabilities of the CM at Registration, including its diplexer cutoff frequency. At that time, if the CM is high-split-capable, the CMTS can move the CM to the Long Channel.

The CMTS and/or burst receiver may maintain various counters, which may be on a per-channel basis, including:
  FEC codeword count;
  Collision counters for broadcast requests and broadcast IM regions;
  Total grants scheduled to each IUC;
  Average RxMER per IUC; or
  any other such counters.
The receiver hardware may not have the ability to keep these counts separately for the Long vs Short Channel. Instead, in many implementations, separate counts for Long vs Short Channel can be created by the CMTS software (for example, by separately summing the per-CM counts for all CMs on the Long Channel and all CMs on the Short Channel). In a few cases this count separation is not possible—for instance, counters for broadcast regions, which are not associated with any CM. Since those regions are largely shared across both Long and Short Channels, the CMTS can manage them as a group, so the combined counters will generally not be an issue. However, in some cases a CMTS might prefer to have separate counters, as described below.

Broadcast and/or multicast opportunities are needed for initial ranging and so CMs can send contention requests. The CMTS has to manage the amount of bandwidth used for these purposes: if too much bandwidth is used, capacity is wasted. If not enough is used, there will be too many collisions and CMs won't be able to join the network or get requests through. Accordingly, the CMTS makes use of counters for collisions, unused slots, and successfully received bursts to manage these regions.

As previously mentioned, it could be difficult to separate these counters out into Long and Short channel counters. Below a split frequency (e.g. 85 MHz), both Long and Short CMs have access to the same contention regions, so in this range it actually makes sense to count everything together; however, above this frequency, channels are available only to Long CMs. Accordingly, in some implementations, contention counters could be kept separately below vs. above the split frequencies (e.g. 85 MHz).

For broadcast initial ranging, it is desired that all CMs use the short channel as previously discussed. Therefore all broadcast IM regions can be placed below the lower split frequency (e.g. 85 MHz). This means the regular per-channel counters will apply to regions below 85 MHz (counters above 85 MHz would all be zero). For contention requests, DOCSIS Priority Request SIDs can be used as a tool to separate out counters For example, a system may use regular broadcast regions below a given frequency such as 85 MHz. Above this frequency, the system may only use a Priority Request SID, and may assign a priority included in the selected Priority Request SID to Long Channel CMs (in some implementations, the priority may be assigned to Short CMs as well, since they would never see it in a Short Channel MAP). The result will be that the counters for the broadcast SID will apply below 85 MHz (Long and Short CMs together), while counters for the selected Priority Request SID will apply above 85 MHz (Long CMs only).

Figure 4:
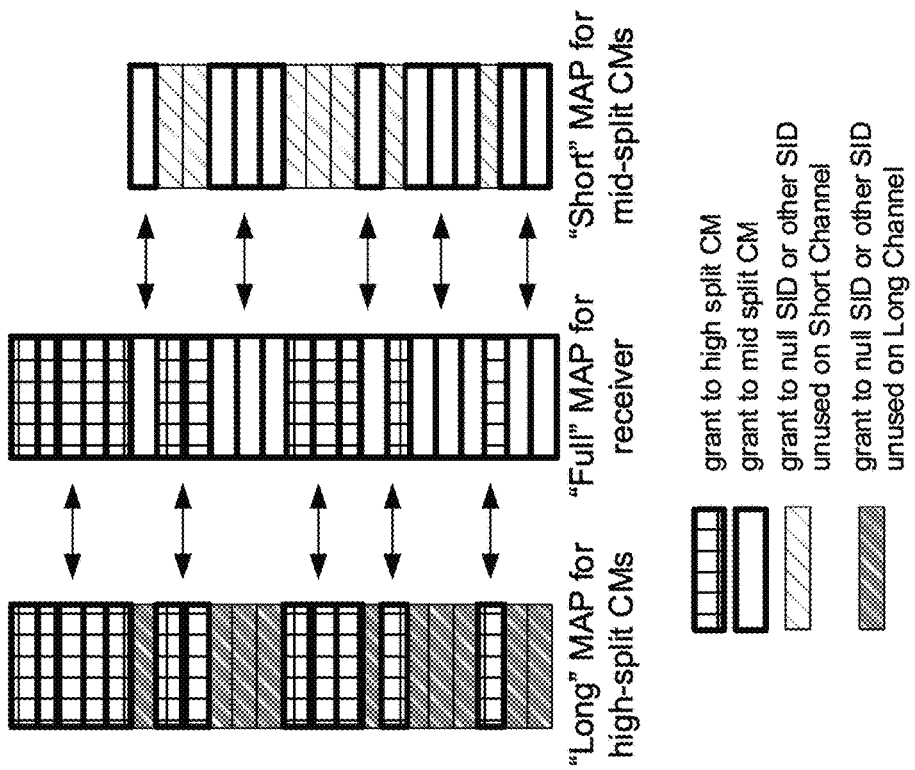
FIG. 4 is an illustration of other implementations of MAP creation, in some embodiments.
Figure 4:
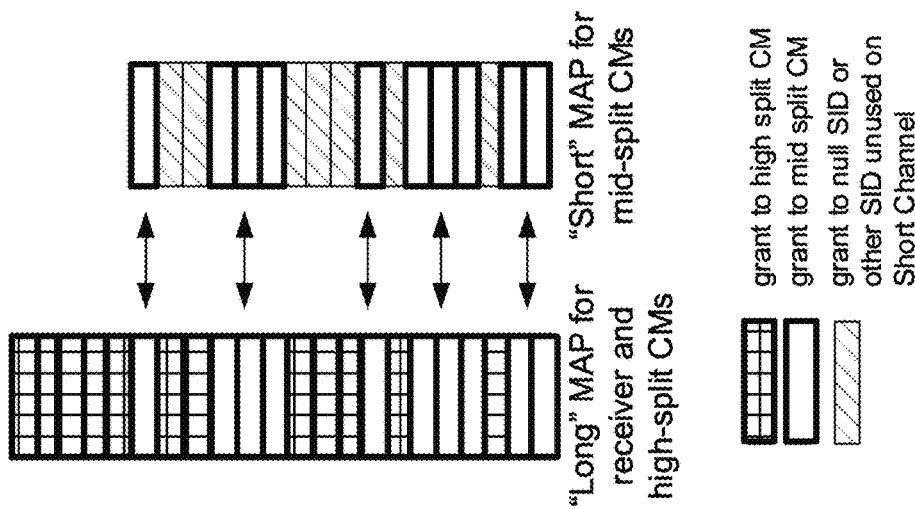

FIG. 4 is an illustration of other implementations of MAP creation. In some implementations, MAPs sent to a receiver must contain all grants. However, MAPs sent to each group of CMs only have to contain grants for those CMs, but are allowed to contain additional grants—since CMs only care about grants to their own SIDs, they will not get confused.

For a CMTS creating these MAPs (by any method), most of the algorithmic and computational complexity is in deciding how to balance grants between Long and Short CMs and then assigning grants such that, in the region of overlap, each minislot is actually used on only one channel. Once these decisions are made, actually creating the MAP messages may be relatively straightforward, so it makes sense to have the CMTS scheduler/software create the combined ("Long" or "Full") MAP for the receiver compared to adding extra hardware or processing capacity to the receiver: the scheduler has already done most of the work already and knows where grants will go for both sets of CMs; and there's no additional hardware cost in the receiver.

Figure 5:
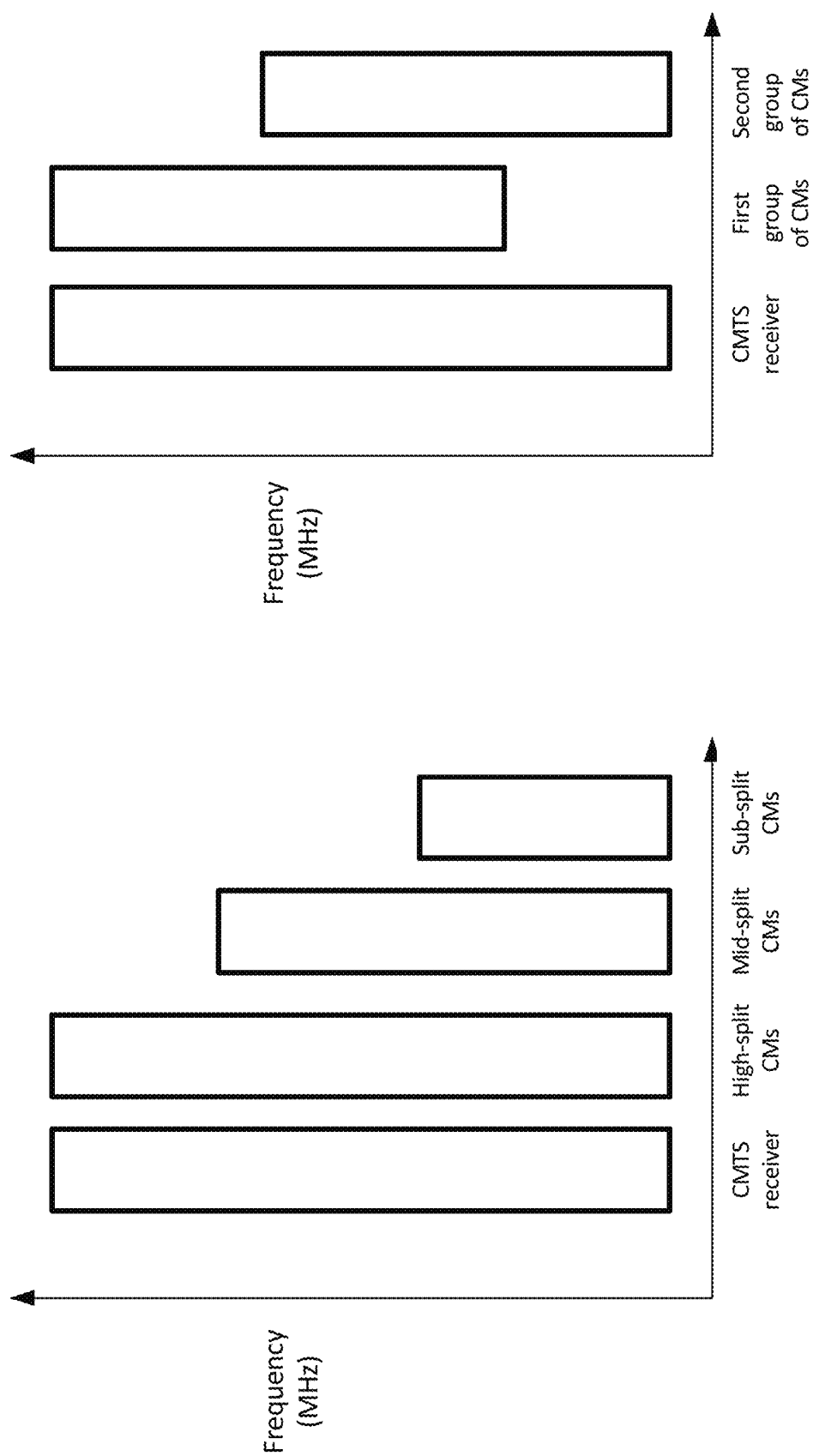
FIG. 5 is an illustration of frequency plans for other various implementations.

FIG. 5 is an illustration of frequency plans for other various implementations. The diagrams are intended to show relationships between UCDs, and exact frequencies or exact types of CMs are not fundamental to the concept. In some implementations, a UCD for a CMTS receiver describes a channel that is no more than 96 MHz wide (95 MHz encompassed spectrum) in accordance with DOC SIS requirements. The UCD for a receiver must cover the full range of frequencies to be used by any CM. Individual CMs or groups of CMs do not have to use the full range of frequencies covered by the receiver, but can use any subset represented by a valid UCD.

In some implementations, the systems and methods discussed herein may be used to support channel overlapping with future DOCSIS 4.0 and higher systems. DOCSIS 4.0 FDD CMTSs are required to receive from 5-684 MHz. In this range DOCSIS 4.0 requires that FDD CMTSs support: 6 OFDMA channels, each 96 MHz wide, covering 108-684 MHz; and 2 OFDMA channels for use below 108 MHz.

DOCSIS 4.0 FDD CMs are required to support: 6 OFDMA channels covering 108-684 MHz; and 1 OFDMA channel for use below 85 MHz. D4.0 FDD CMs cannot transmit between 85 and 108 MHz.

Accordingly, in some implementations, D4.0 FDD CMs could also coexist on a plant with:

DOCSIS 3.1 high split CMs: two OFDMA channels available below 204 MHz

DOCSIS 3.1 mid split CMs: two OFDMA channel available below 85 MHz

In a DOCSIS 4.0 FDD system, an operator might wish to support a frequency plan such as (example):

one OFDMA channel at low frequencies, for instance 5-20 MHz. These frequencies are often noisy and usually cannot support SC-QAM channels, but OFDMA works well here.

SC-QAM channels above this, for instance 20-42 MHz (for use by legacy D3.0 devices).

another OFDMA channel, for instance 42-108 MHz.

six extended band OFDMA channels from 108-684 MHz.

The above uses the full complement of OFDMA resources in the CMTS. The channel from 42-108 MHz would become the overlap channel, with a Long Channel from 42-108 and Short Channel from 42-85. These could be assigned as follows (other assignments are possible):

D4.0 CM: Short channel

D3.1 high split CM: Long Channel

D3.1 mid split CM: Short Channel

Figure 6:
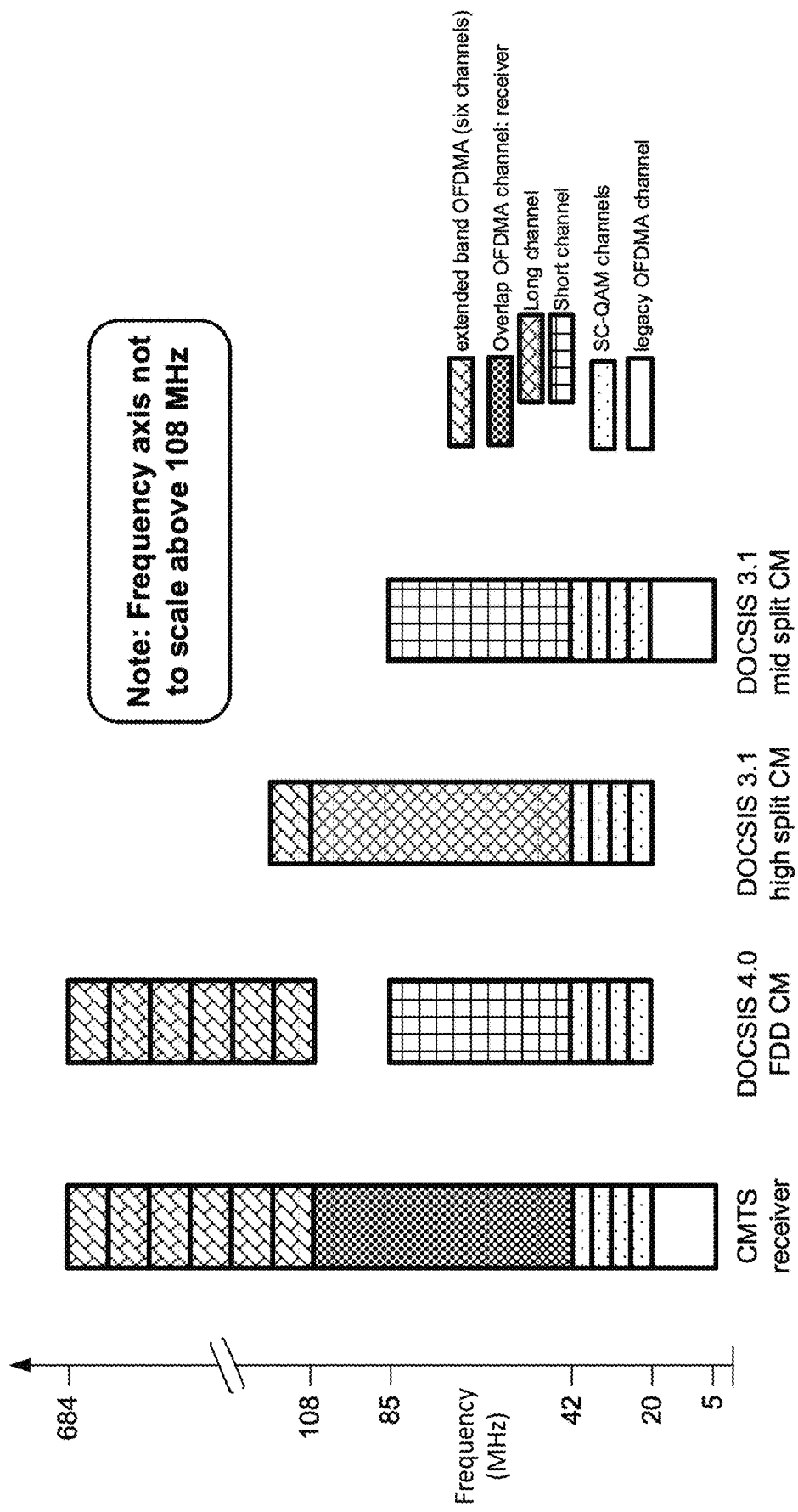
FIG. 6 is an illustration of an implementation of a DOCSIS 4.0 or higher frequency plan.

Overlapping channels makes it possible to fully utilize the resources of all these different types of CMs. FIG. 6 provides an illustration of one such implementation of a D4.0 frequency plan.

Accordingly, implementations of the systems and methods discussed herein provide a CMTS with capability for managing overlapping OFDMA channels to support mid-split and high-split CMs, without modification to legacy CMs.

In a first aspect, the present disclosure is directed to a device. The device includes a transceiver in communication with a first one or more devices and a second one or more devices, the first one or more devices capable of communication above a first frequency and the second one or more devices incapable of communication above the first frequency; and circuitry configured to generate and transmit, via the transceiver: a first communication identifying a first set of channel allocations covering a frequency range from a second frequency lower than the first frequency to a third frequency higher than the first frequency; and a second communication identifying a second set of channel allocations covering a frequency range from the second frequency to the first frequency. The first one or more devices utilize the first set of channel allocations, and the second one or more devices utilize the second set of channel allocations.

In some implementations, the first set of channel allocations has a first channel identifier, and the second set of channel allocations has a different second channel identifier. In some implementations, the second set of channel allocations correspond to a subset of the first set of channel allocations below the first frequency. In a further implementation, each channel allocation of the second set of channel allocations is associated with a corresponding channel allocation of the subset of the first set of channel allocations below the first frequency. In a still further implementation, a first channel allocation of the first set of channel allocations and a corresponding second channel allocation of the second set of channel allocations have identical physical channel parameters. In a yet still further implementation, the physical channel parameters of the first channel allocation and the corresponding second channel allocation are each transmitted, by the circuitry of the device via the transceiver, to the first one or more devices and the second one or more devices via an upstream channel descriptor (UCD) message. In another further implementation, a first channel allocation of the first set of channel allocations is associated with a first identifier, and a corresponding second channel allocation of the second set of channel allocations is associated with a second identifier different from the first identifier by an offset value. In a still further implementation, the circuitry is further configured to: receive a third communication from a device of the second one or more devices incapable of communication above the first frequency, the third communication associated with the second channel allocation of the second set of channel allocations; and subtract the offset value from a timestamp in the third communication.

In some implementations, the circuitry is further configured to assign a first subchannel to a device of the first one or more devices, the first subchannel having a frequency range above the first frequency; and the first communication identifies the assignment of the first subchannel, and the second communication does not identify the assignment of the first subchannel. In a further implementation, the circuitry is further configured to assign a second subchannel to a device of the first one or more devices, the second subchannel having a frequency range lower than the first frequency; and the first communication and the second communication identify the assignment of the second subchannel. In some implementations, the device includes circuitry configured to use a single receiver instance to receive transmissions from both the first one or more devices and the second one or more devices.

In another aspect, the present disclosure is directed to a method, including generating, by circuitry of a device in communication with a first one or more devices capable of communication above a first frequency and a second one or more devices incapable of communication above the first frequency, a first communication identifying a first set of channel allocations covering a frequency range from a second frequency lower than the first frequency to a third frequency higher than the first frequency; generating, by the circuitry, a second communication identifying a second set of channel allocations covering a frequency range from the second frequency to the first frequency; and transmitting, by the circuitry via a transceiver of the device, the first communication and the second communication, receipt of the first communication causing the first one or more devices to utilize the first set of channel allocations and receipt of the second communication causing the second one or more devices to utilize the second set of channel allocations.

In some implementations, the first set of channel allocations has a first channel identifier, and the second set of channel allocations has a different second channel identifier. In some implementations, the second set of channel allocations correspond to a subset of the first set of channel allocations below the first frequency. In a further implementation, each channel allocation of the second set of channel allocations is associated with a corresponding channel allocation of the subset of the first set of channel allocations below the first frequency. In a still further implementation, a first channel allocation of the first set of channel allocations and a corresponding second channel allocation of the second set of channel allocations have identical physical channel parameters. In a yet still further implementation, transmitting the first communication and the second communication each comprise transmitting, by the circuitry of the device via the transceiver, an upstream channel descriptor (UCD) message. In another further implementation, a first channel allocation of the first set of channel allocations is associated with a first identifier, and a corresponding second channel allocation of the second set of channel allocations is associated with a second identifier different from the first identifier by an offset value. In a still further implementation, the method includes receiving, by the circuitry via the transceiver, a third communication from a device of the second one or more devices incapable of communication above the first frequency, the third communication associated with the second channel allocation of the second set of channel allocations; and subtracting, by the circuitry, the offset value from a timestamp in the third communication.

In some implementations, the method includes assigning, by the circuitry, a first subchannel to a device of the first one or more devices, the first subchannel having a frequency range above the first frequency; and the first communication identifies the assignment of the first subchannel, and the second communication does not identify the assignment of the first subchannel. In a further implementation, the method includes assigning, by the circuitry, a second subchannel to a device of the first one or more devices, the second subchannel having a frequency range lower than the first frequency; and the first communication and the second communication identify the assignment of the second subchannel. In some implementations, the method includes receiving, by a single receiver instance of the device, transmissions from both the first one or more devices and the second one or more devices.

B. Computing and Network Environment

Figure 7A:
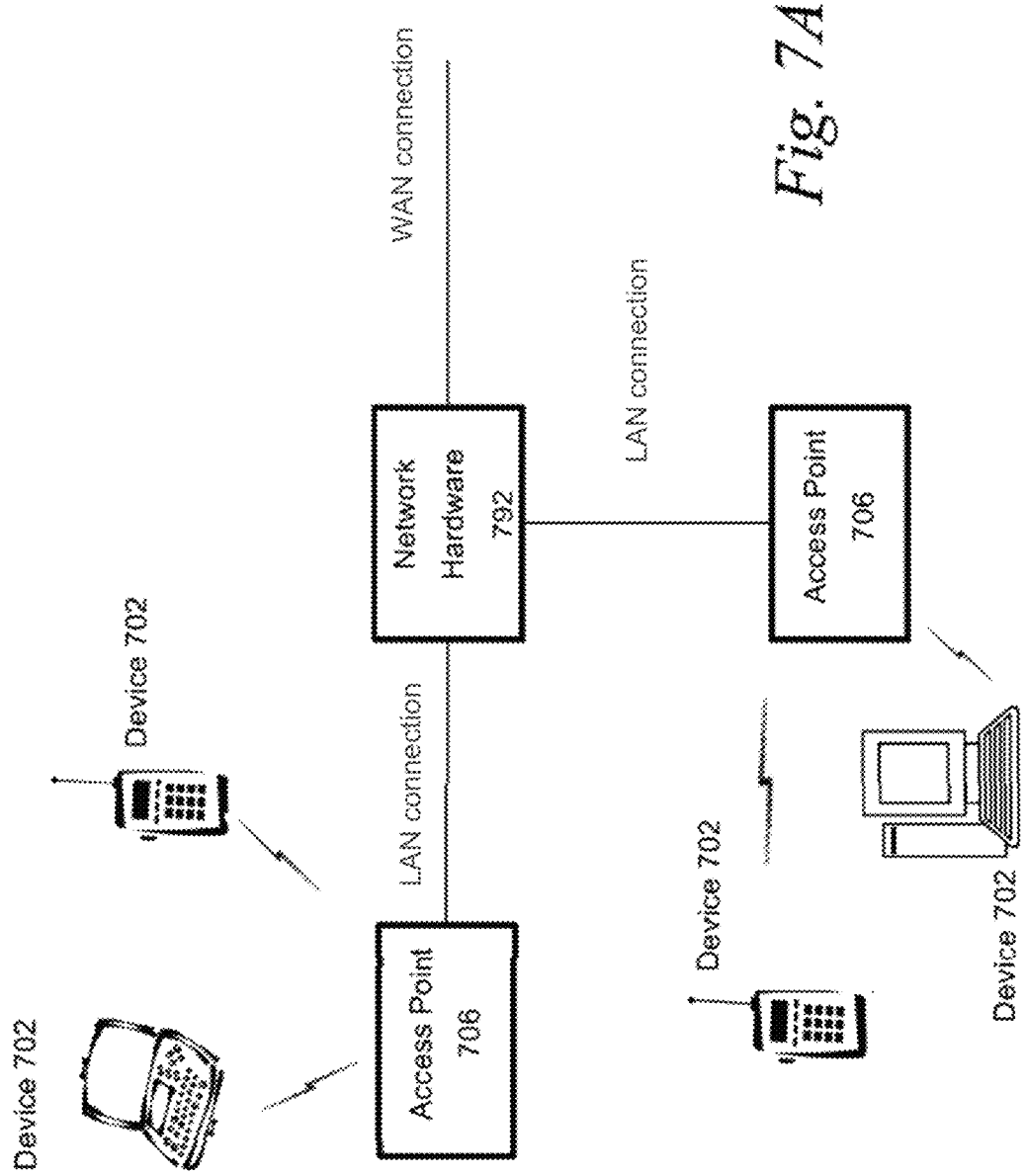
FIG. 7A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 7A, an embodiment of a network environment is depicted. In brief overview, the network environment includes a wireless communication system that includes one or more access points 706, one or more wireless communication devices 702 and a network hardware component 792. The wireless communication devices 702 may for example include laptop computers 702, tablets 702, personal computers 702 and/or cellular telephone devices 702. The details of an embodiment of each wireless communication device and/or access point are described in greater detail with reference to FIGS. 7B and 7C. The network environment can be an ad hoc network environment, an infrastructure wireless network environment, a subnet environment, etc. in one embodiment The access points (APs) 706 may be operably coupled to the network hardware 792 via local area network connections. The network hardware 792, which may include a router, gateway, switch, bridge, modem, system controller, appliance, etc., may provide a local area network connection for the communication system. Each of the access points 706 may have an associated antenna or an antenna array to communicate with the wireless communication devices 702 in its area. The wireless communication devices 702 may register with a particular access point 706 to receive services from the communication system (e.g., via a SU-MIMO or MU-MIMO configuration). For direct connections (e.g., point-to-point communications), some wireless communication devices 702 may communicate directly via an allocated channel and communications protocol. Some of the wireless communication devices 702 may be mobile or relatively static with respect to the access point 706.

In some embodiments an access point 706 includes a device or module (including a combination of hardware and software) that allows wireless communication devices 702 to connect to a wired network using Wi-Fi, or other standards. An access point 706 may sometimes be referred to as an wireless access point (WAP). An access point 706 may be configured, designed and/or built for operating in a wireless local area network (WLAN). An access point 706 may connect to a router (e.g., via a wired network) as a stand-alone device in some embodiments. In other embodiments, an access point can be a component of a router. An access point 706 can provide multiple devices 702 access to a network. An access point 706 may, for example, connect to a wired Ethernet connection and provide wireless connections using radio frequency links for other devices 702 to utilize that wired connection. An access point 706 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 706 may be used for (e.g., in-home or in-building) wireless networks (e.g., IEEE 802.11, Bluetooth, ZigBee, any other type of radio frequency based network protocol and/or variations thereof). Each of the wireless communication devices 702 may include a built-in radio and/or is coupled to a radio. Such wireless communication devices 702 and/or access points 706 may operate in accordance with the various aspects of the disclosure as presented herein to enhance performance, reduce costs and/or size, and/or enhance broadband applications. Each wireless communication devices 702 may have the capacity to function as a client node seeking access to resources (e.g., data, and connection to networked nodes such as servers) via one or more access points 706.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 7B:
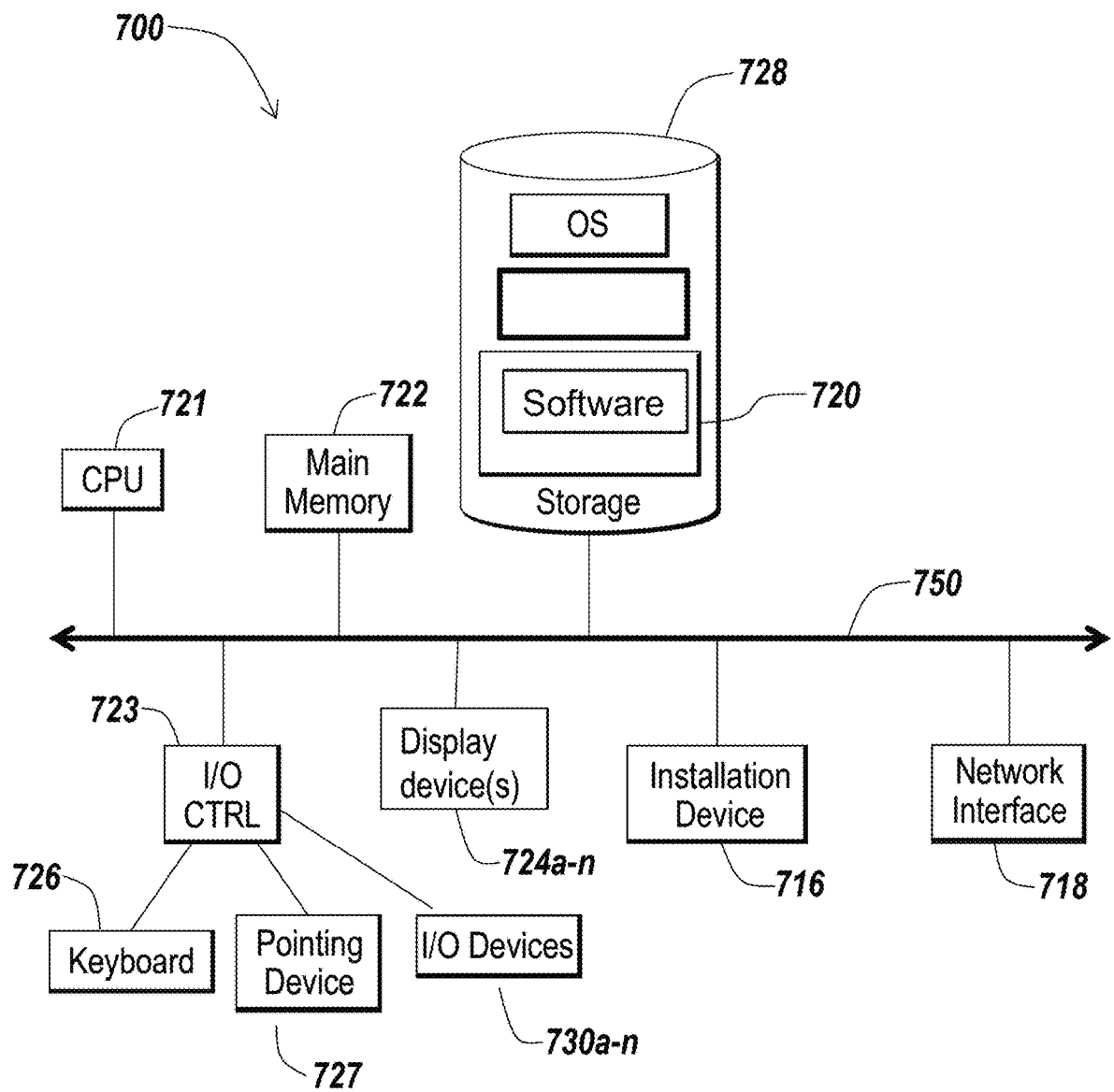
FIGS. 7B and 7C are block diagrams depicting embodiments of computing devices useful in connection with the methods and systems described herein.
Figure 7C:
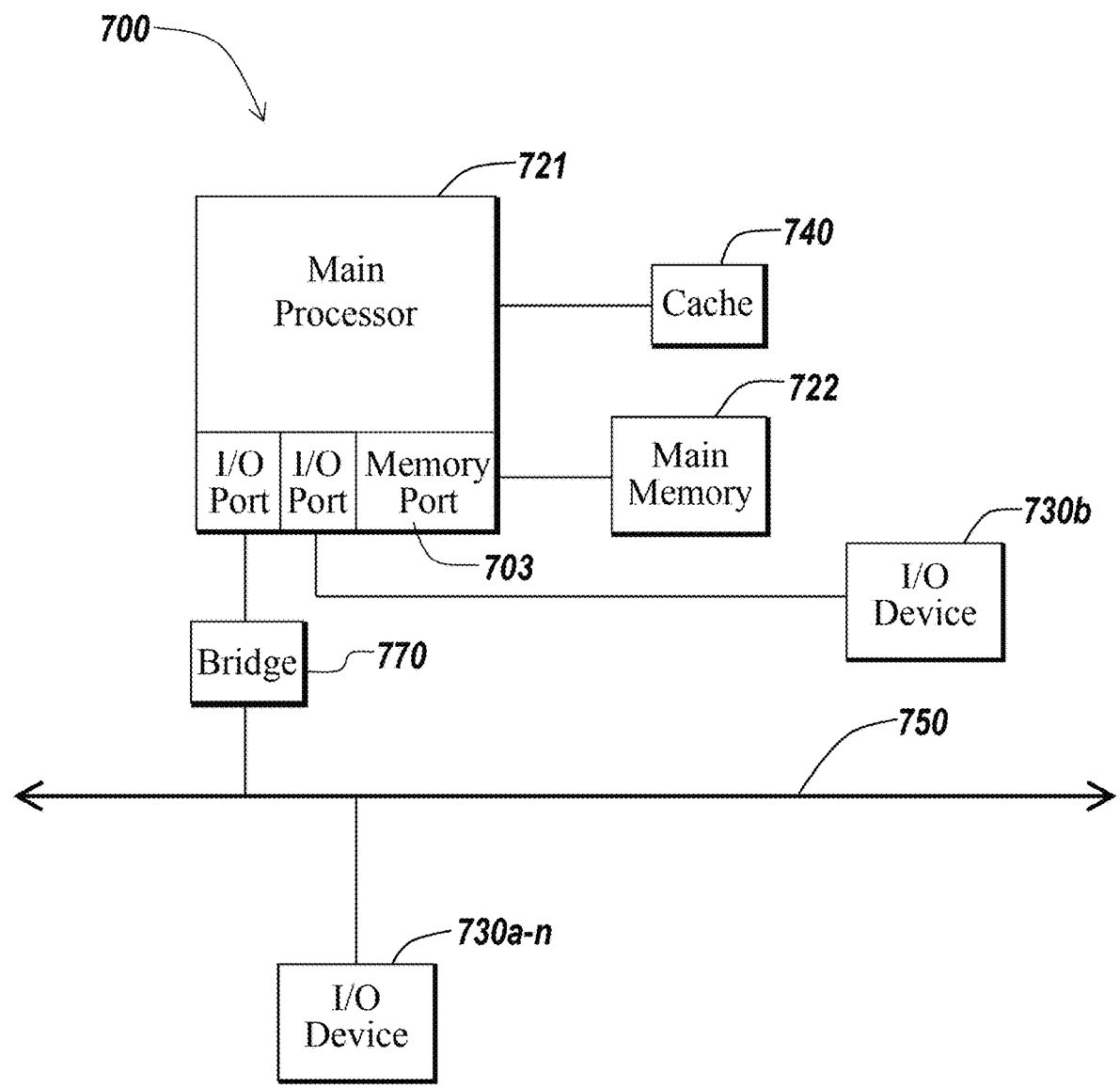

The communications device(s) 702 and access point(s) 706 may be deployed as and/or executed on any type and form of computing device, such as a computer, network device or appliance capable of communicating on any type and form of network and performing the operations described herein. FIGS. 7B and 7C depict block diagrams of a computing device 700 useful for practicing an embodiment of the wireless communication devices 702 or the access point 706. As shown in FIGS. 7B and 7C, each computing device 700 includes a central processing unit 721, and a main memory unit 722. As shown in FIG. 7B, a computing device 700 may include a storage device 728, an installation device 716, a network interface 718, an I/O controller 723, display devices 724a-724n, a keyboard 726 and a pointing device 727, such as a mouse. The storage device 728 may include, without limitation, an operating system and/or software. As shown in FIG. 7C, each computing device 700 may also include additional optional elements, such as a memory port 703, a bridge 770, one or more input/output devices 730a-730n (generally referred to using reference numeral 730), and a cache memory 740 in communication with the central processing unit 721.

The central processing unit 721 is any logic circuitry that responds to and processes instructions fetched from the main memory unit 722. In many embodiments, the central processing unit 721 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 700 may be based on any of these processors, or any other processor capable of operating as described herein.

Main memory unit 722 may be one or more memory chips capable of storing data and allowing any storage location to be directly accessed by the microprocessor 721, such as any type or variant of Static random access memory (SRAM), Dynamic random access memory (DRAM), Ferroelectric RAM (FRAM), NAND Flash, NOR Flash and Solid State Drives (SSD). The main memory 722 may be based on any of the above described memory chips, or any other available memory chips capable of operating as described herein. In the embodiment shown in FIG. 7B, the processor 721 communicates with main memory 722 via a system bus 750 (described in more detail below). FIG. 7C depicts an embodiment of a computing device 700 in which the processor communicates directly with main memory 722 via a memory port 703. For example, in FIG. 7C the main memory 722 may be DRDRAM.

FIG. 7C depicts an embodiment in which the main processor 721 communicates directly with cache memory 740 via a secondary bus, sometimes referred to as a backside bus. In other embodiments, the main processor 721 communicates with cache memory 740 using the system bus 750. Cache memory 740 typically has a faster response time than main memory 722 and is provided by, for example, SRAM, BSRAM, or EDRAM. In the embodiment shown in FIG. 7C, the processor 721 communicates with various I/O devices 730 via a local system bus 750. Various buses may be used to connect the central processing unit 721 to any of the I/O devices 730, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 724, the processor 721 may use an Advanced Graphics Port (AGP) to communicate with the display 724. FIG. 7C depicts an embodiment of a computer 700 in which the main processor 721 may communicate directly with I/O device 730b, for example via HYPERTRANSPORT, RAPIDIO, or INFINIBAND communications technology. FIG. 7C also depicts an embodiment in which local busses and direct communication are mixed: the processor 721 communicates with I/O device 730a using a local interconnect bus while communicating with I/O device 730b directly.

A wide variety of I/O devices 730a-730n may be present in the computing device 700. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 723 as shown in FIG. 7B. The I/O controller may control one or more I/O devices such as a keyboard 726 and a pointing device 727, e.g., a mouse or optical pen. Furthermore, an I/O device may also provide storage and/or an installation medium 716 for the computing device 700. In still other embodiments, the computing device 700 may provide USB connections (not shown) to receive handheld USB storage devices such as the USB Flash Drive line of devices manufactured by Twintech Industry, Inc. of Los Alamitos, California.

Referring again to FIG. 7B, the computing device 700 may support any suitable installation device 716, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 700 may further include a storage device, such as one or more hard disk drives or redundant arrays of independent disks, for storing an operating system and other related software, and for storing application software programs such as any program or software 720 for implementing (e.g., configured and/or designed for) the systems and methods described herein. Optionally, any of the installation devices 716 could also be used as the storage device. Additionally, the operating system and the software can be run from a bootable medium.

Furthermore, the computing device 700 may include a network interface 718 to interface to the network 704 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 700 communicates with other computing devices 700' via any type and/or form of gateway or tunneling protocol such as Secure Socket Layer (SSL) or Transport Layer Security (TLS). The network interface 718 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

In some embodiments, the computing device 700 may include or be connected to one or more display devices 724a-724n. As such, any of the I/O devices 730a-730n and/or the I/O controller 723 may include any type and/or form of suitable hardware, software, or combination of hardware and software to support, enable or provide for the connection and use of the display device(s) 724a-724n by the computing device 700. For example, the computing device 700 may include any type and/or form of video adapter, video card, driver, and/or library to interface, communicate, connect or otherwise use the display device(s) 724a-724n. In one embodiment, a video adapter may include multiple connectors to interface to the display device(s) 724a-724n. In other embodiments, the computing device 700 may include multiple video adapters, with each video adapter connected to the display device(s) 724a-724n. In some embodiments, any portion of the operating system of the computing device 700 may be configured for using multiple displays 724a-724n. One ordinarily skilled in the art will recognize and appreciate the various ways and embodiments that a computing device 700 may be configured to have one or more display devices 724a-724n.

In further embodiments, an I/O device 730 may be a bridge between the system bus 750 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 700 of the sort depicted in FIGS. 7B and 7C may operate under the control of an operating system, which control scheduling of tasks and access to system resources. The computing device 700 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 700 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 700 has sufficient processor power and memory capacity to perform the operations described herein.

In some embodiments, the computing device 700 may have different processors, operating systems, and input devices consistent with the device. For example, in one embodiment, the computing device 700 is a smart phone, mobile device, tablet or personal digital assistant. In still other embodiments, the computing device 700 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 700 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A device, comprising:
  a transceiver in communication with first one or more devices and second one or more devices, the first one or more devices capable of communication above a first frequency and the second one or more devices incapable of communication above the first frequency; and
  circuitry configured to generate and transmit, via the transceiver:
    a first communication identifying a first set of channel allocations covering a frequency range from a second frequency lower than the first frequency to a third frequency higher than the first frequency, and
    a second communication identifying a second set of channel allocations covering a frequency range from the second frequency to the first frequency; and
  wherein the first one or more devices utilize the first set of channel allocations, and the second one or more devices utilize the second set of channel allocations,
  wherein a first channel allocation of the first set of channel allocations is associated with a first identifier, and a corresponding second channel allocation of the second set of channel allocations is associated with a second identifier different from the first identifier by an offset value.

2. The device of claim 1, wherein the second set of channel allocations correspond to a subset of the first set of channel allocations below the first frequency.

3. The device of claim 2, wherein each channel allocation of the second set of channel allocations is associated with a corresponding channel allocation of the subset of the first set of channel allocations below the first frequency.

4. The device of claim 3, wherein a first channel allocation of the first set of channel allocations and a corresponding second channel allocation of the second set of channel allocations have identical physical channel parameters.

5. The device of claim 4, wherein the physical channel parameters of the first channel allocation and the corresponding second channel allocation are each transmitted, by the circuitry of the device via the transceiver, to the first one or more devices and the second one or more devices via an upstream channel descriptor (UCD) message.

6. The device of claim 1, wherein the circuitry is further configured to:
  receive a third communication from a device of the second one or more devices incapable of communication above the first frequency, the third communication associated with the second channel allocation of the second set of channel allocations; and
  subtract the offset value from a timestamp in the third communication.

7. The device of claim 1, wherein the circuitry is further configured to assign a first subchannel to a device of the first one or more devices, the first subchannel having a frequency range above the first frequency; and
  wherein the first communication identifies the assignment of the first subchannel, and the second communication does not identify the assignment of the first subchannel.

8. The device of claim 7, wherein the circuitry is further configured to assign a second subchannel to a device of the first one or more devices, the second subchannel having a frequency range lower than the first frequency; and
  wherein the first communication and the second communication identify the assignment of the second subchannel.

9. The device of claim 1, further comprising circuitry configured to use a single receiver instance to receive transmissions from both the first one or more devices and the second one or more devices.

10. A method, comprising:
  generating, by circuitry of a device in communication with a first one or more devices capable of communication above a first frequency and a second one or more devices incapable of communication above the first frequency, a first communication identifying a first set of channel allocations covering a frequency range from a second frequency lower than the first frequency to a third frequency higher than the first frequency;
  generating, by the circuitry, a second communication identifying a second set of channel allocations covering a frequency range from the second frequency to the first frequency; and
  transmitting, by the circuitry via a transceiver of the device, the first communication and the second communication, receipt of the first communication causing the first one or more devices to utilize the first set of channel allocations and receipt of the second communication causing the second one or more devices to utilize the second set of channel allocations, wherein a first channel allocation of the first set of channel allocations is associated with a first identifier, and a corresponding second channel allocation of the second set of channel allocations is associated with a second identifier different from the first identifier by an offset value.

11. The method of claim 10, wherein the second set of channel allocations correspond to a subset of the first set of channel allocations below the first frequency.

12. The method of claim 11, wherein each channel allocation of the second set of channel allocations is associated with a corresponding channel allocation of the subset of the first set of channel allocations below the first frequency.

13. The method of claim 12, wherein a first channel allocation of the first set of channel allocations and a corresponding second channel allocation of the second set of channel allocations have identical physical channel parameters.

14. The method of claim 13, wherein transmitting the first communication and the second communication each comprise transmitting, by the circuitry of the device via the transceiver, an upstream channel descriptor (UCD) message.

15. The method of claim 10, further comprising:
receiving, by the circuitry via the transceiver, a third communication from a device of the second one or more devices incapable of communication above the first frequency, the third communication associated with the second channel allocation of the second set of channel allocations; and
subtracting, by the circuitry, the offset value from a timestamp in the third communication.

16. The method of claim 10, further comprising assigning, by the circuitry, a first subchannel to a device of the first one or more devices, the first subchannel having a frequency range above the first frequency; and
wherein the first communication identifies the assignment of the first subchannel, and the second communication does not identify the assignment of the first subchannel.

17. The method of claim 16, further comprising assigning, by the circuitry, a second subchannel to a device of the first one or more devices, the second subchannel having a frequency range lower than the first frequency; and
wherein the first communication and the second communication identify the assignment of the second subchannel.

18. The method of claim 10, further comprising receiving, by a single receiver instance of the device, transmissions from both the first one or more devices and the second one or more devices.

* * * * *